(12) United States Patent
Roman et al.

(10) Patent No.: US 8,375,136 B2
(45) Date of Patent: Feb. 12, 2013

(54) DEFINING AND IMPLEMENTING POLICIES ON MANAGED OBJECT-ENABLED MOBILE DEVICES

(75) Inventors: Manuel Roman, Barcelona (ES); Gregory D. Buzzard, Aptos, CA (US); Shahid Shoaib, Mountain View, CA (US); Eugene Krivopaltsev, San Jose, CA (US); Michael Diener, Berlin (DE)

(73) Assignee: Innopath Software, Inc., Sunnyvale, CA (US)

( * ) Notice: Subject to any disclaimer, the term of this patent is extended or adjusted under 35 U.S.C. 154(b) by 409 days.

(21) Appl. No.: 12/188,874

(22) Filed: Aug. 8, 2008

(65) Prior Publication Data

US 2009/0049166 A1 Feb. 19, 2009

Related U.S. Application Data

(60) Provisional application No. 60/964,131, filed on Aug. 8, 2007, provisional application No. 60/964,180, filed on Aug. 8, 2007.

(51) Int. Cl.
*G06F 15/173* (2006.01)
*G06F 15/177* (2006.01)

(52) U.S. Cl. .................. 709/229; 709/220; 709/223

(58) Field of Classification Search .................. 709/223, 709/200, 220, 229; 719/321; 370/395.2
See application file for complete search history.

(56) References Cited

U.S. PATENT DOCUMENTS

| 2005/0055397 | A1* | 3/2005 | Zhu et al. ....................... 709/200 |
| 2006/0143179 | A1* | 6/2006 | Draluk et al. ...................... 707/9 |
| 2007/0195785 | A1* | 8/2007 | Song et al. .................. 370/395.2 |
| 2008/0104207 | A1* | 5/2008 | Pulkkinen et al. ............ 709/220 |
| 2008/0163262 | A1* | 7/2008 | He ................................. 719/321 |
| 2008/0256251 | A1* | 10/2008 | Huotari et al. ................ 709/229 |

* cited by examiner

*Primary Examiner* — Aaron Strange
(74) *Attorney, Agent, or Firm* — Gregory & Sawrie LLP

(57) ABSTRACT

Embodiments of a system configured to manage policies, including decision policies and active policies, on an Open Mobile Alliance Device Management (OMA DM) enabled mobile client devices is described. The system is configured to manage policies, including decision policies and active policies, on mobile devices. The system includes a device policy repository, a policy decision point, a decision policy enforcer, and an active policy enforcer. The system includes a server-side process configured to allow creation, modification and transmission of defined policies to the mobile client device, and a client-side process executed on the mobile client device and configured store the defined policies in an OMA DM management tree in the mobile client device as management objects, wherein each policy of the defined policies is represented as a subnode of the management tree.

16 Claims, 11 Drawing Sheets

DEFINING AND IMPLEMENTING POLICIES ON MANAGED OBJECT-ENABLED MOBILE DEVICES

CROSS-REFERENCE TO RELATED APPLICATIONS

This application claims priority from U.S. Provisional Patent Application No. 60/964,131, entitled "Managing and Enforcing Policies on Mobile Devices", filed Aug. 8, 2007, which is incorporated by reference in its entirety herein; and from U.S. Provisional Patent Application No. 60/964,180, entitled "Integrated Mobile Device Management," filed Aug. 8, 2007, which is incorporated by reference in its entirety herein.

The present application is related to U.S. patent application Ser. No. 12/188,936, entitled "Managing and Enforcing Policies on Mobile Devices," filed Aug. 8, 2008, and which is assigned to the assignee of the present invention.

TECHNICAL FIELD

Embodiments are described relating to telecommunication devices, and more specifically to managing and enforcing policies on mobile devices.

BACKGROUND

Mobile and remotely managed devices such as cellular phones, television set-top boxes, home internet gateways and so forth are becoming increasingly prevalent and increasingly complex. As the complexity of such devices increases, so does the necessity to enable service providers to assume much of the burden of being able to remotely manage them. Many management activities that control the operational behavior of a remote device require a complex interaction of policies that derive from one or more sources. Such sources may include the service operator (e.g., cell phone company or cable company), the subscriber (customer of the service operator), enterprises or business customers, and other third parties.

Remote devices may be controlled in a number of different ways. Two fundamental dimensions of control are usage control and the other is operational control. Usage control pertains to control over application and services available to and executed on or accessed by the device. Examples of usage control include a service operator restricting usage of certain applications so that only applications that have been paid for may be used on a given device, a subscribing parent (referred to as a master subscriber) attempting to ensure that their child does not use the music player or game application on their cell phone while at school, or an enterprise dictating that their employees' cell phones vibrate, rather than ring, when they are in executive meeting rooms, and other similar application controls. Operational control pertains to the operation of the device itself, and the various hardware elements of the device, such as power, input/output, and transceiver circuits. Examples of operational control include limiting device power consumption if the battery is running low, increasing radio sensitivity if interference is detected, increasing speaker volume in noisy environments, and other similar operational characteristics.

At present, mobile devices are controlled almost exclusively by the user. The user must manually set or modify operational settings, such as ring mode, speaker volume, keypad configuration, and so on. With regard to usage control, service providers are generally able to enable or disable certain functions on a remote device, but control is generally limited to simple on/off settings. Present devices do not support usage control based on dynamic or operational characteristics of the device. Consequently, such control requires user configuration. Thus, in order to enforce usage policies or rules, or set certain operational characteristics, a relatively high level of user input is required. As such, present mobile devices are passive devices that are not capable of significant autonomic operation, but instead require active monitoring and configuration by service providers and users.

Some systems have been developed with some form of remote policy management for networked devices. One such system manages network elements using a proxy that detects events of interest. Such systems typically work only on network elements and not remote devices or terminals and require a central policy processing point to handle detected events.

In certain cases, standard management protocols may be used by a server to retrieve, analyze and set management properties values for a mobile client. The management property values can be stored within known structure, such as a device management tree. Though such server-driven management presents a mandatory channel, it implies that the server is the component primarily responsible for taking management decisions for the mobile client. Such existing management paradigms can thus be viewed as reactive rather than proactive because management and monitoring is conducted after a problem is reported by a consumer.

What is needed, therefore, is a mobile device policy enforcement system that allows for true autonomous operation of mobile devices.

What is further needed is a mobile device management framework that facilitates proactive management of mobile devices based on operational and use conditions sensed on the mobile device.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of the invention as described herein provide a solution to the problems of conventional methods as stated above. Embodiments of a system configured to manage policies, including decision policies and active policies, Open Mobile Alliance Device Management (OMA DM) enabled mobile client devices are described. The system includes a device policy repository, a policy decision point, a decision policy enforcer, and an active policy enforcer. The system includes a method for enforcing policies on mobile devices that proactively monitors the execution environment and automatically triggers active policies. The method further exports an interface and provides functionality to evaluate and enforce decision policies. The system can combine policies from different sources, including detecting and avoiding policy conflicts. The system includes a server-side process configured to allow creation, modification and transmission of defined policies to the mobile client device, and a client-side process executed on the mobile client device and configured store the defined policies in an OMA DM management tree in the mobile client device as management objects, wherein each policy of the defined policies is represented as a subnode of the management tree.

In the following description, various examples are given for illustration, but none are intended to be limiting. The embodiments described herein provide a method and apparatus for managing a set of machine interpretable policy directions and enabling the enforcement of such policies on a mobile, or similarly remotely managed, device. The embodiments described herein include a system for enforcing policies on mobile devices and methods for enforcing policies on mobile devices.

Figure 1:
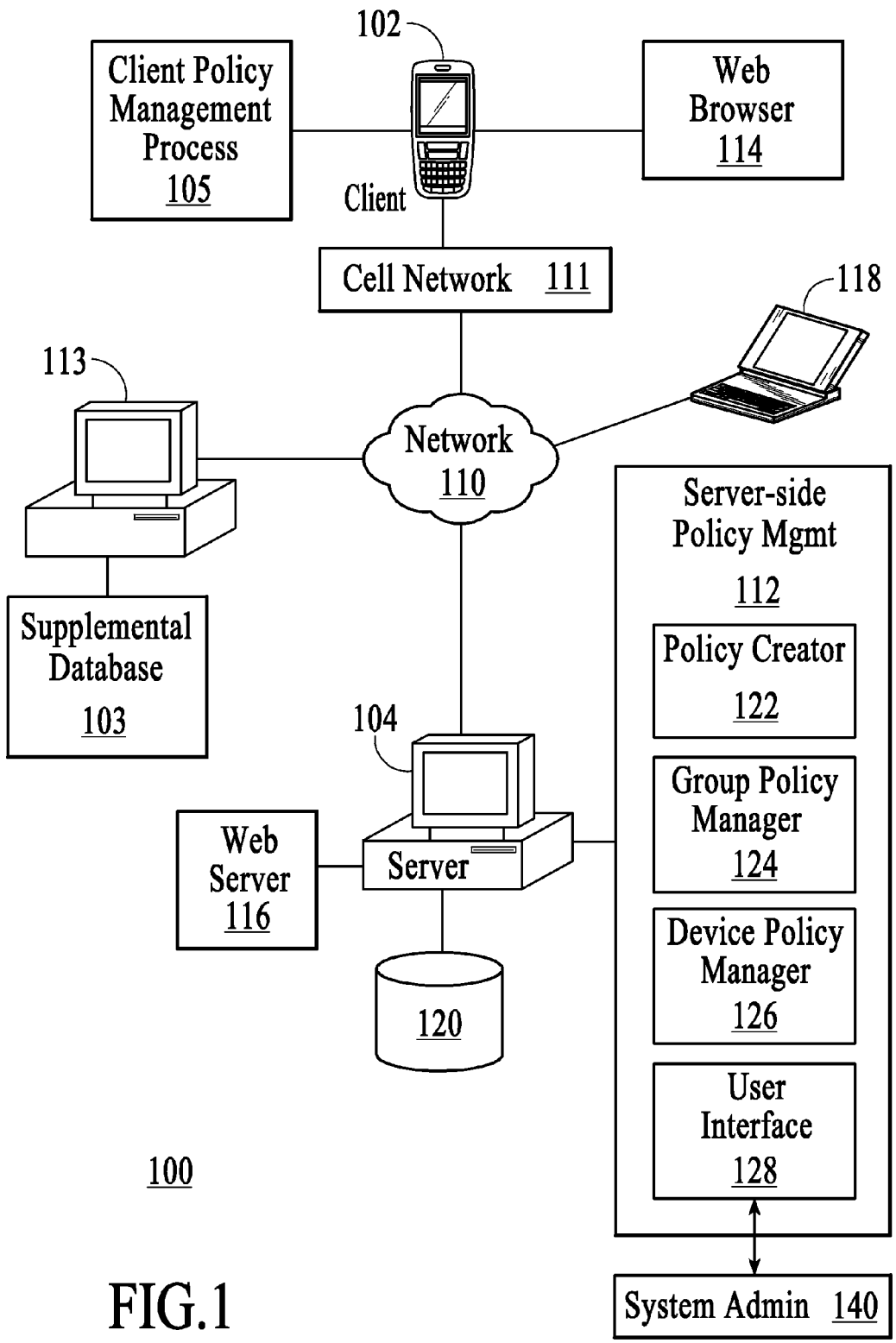
FIG. 1 illustrates a computer network system 100 that implements one or more embodiments of a mobile policy management system.

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments of a mobile policy management system. In system 100, a network server computer 104 is coupled, directly or indirectly, to one or more network client computers 102 and 118 through a network 110, and one or more possible other networks, such as cellular telephone network 111. The network interface between server computer 104 and client computer 102 may include one or more routers that serve to buffer and route the data transmitted between the server and client computers. Network 110 may be the Internet, a Wide Area Network (WAN), a Local Area Network (LAN), or any combination thereof.

In one embodiment, server 104 in network system 100 is a server that executes a server-side mobile device policy enforcement process 112. This process may represent one or more executable programs modules that are stored within network server 104 and executed locally within the server. Alternatively, however, it may be stored on a remote storage or processing device coupled to server 104 or network 110 and accessed by server 104 to be locally executed. In a further alternative embodiment, the policy management process 112 may be implemented in a plurality of different program modules, each of which may be executed by two or more distributed server computers coupled to each other, or to network 110 separately.

For an embodiment in which network 110 is the Internet, network server 104 executes a World-Wide Web (WWW) server process 116 that stores data in the form of web pages and transmits these pages as Hypertext Markup Language (HTML) files over the Internet 110 to the clients 102 and 118. For this embodiment, the client or clients may run a web browser program 114 to access the web pages served by server computer 104 and any available content provider or supplemental server 103.

Alternatively, the server and client computer may use a dedicated application program and API (application program interface) communication scheme.

In one embodiment, the client device 102 executes a client-side policy management system to interact with the server-side policy management process 112 and to allow autonomous control of the device. A separate content provider 103 may provide some of the data that is included in the policy management process. Data for any of the policies, business rules, and the like may be provided by a data store 120 closely or loosely coupled to any of the server 104 and/or client 102.

The client device is typically a mobile client device that provides various utilities, such as communication, entertainment, navigation, information management, and basic computing functions. Mobile client 102 may be a cell phone, smartphone, or any mobile communication device that provides access to the network 110 and has a sufficient degree of user input and processing capability to execute the client-side policy enforcement process 105. The client computer 102 may also be embodied in a standard mobile computing device 118 such as a notebook computer, personal digital assistant, game console, media playback unit, or similar computing device. The client computers 102 and 118 may be coupled to the server computer 104 over a wired connection, a wireless connection or any combination thereof. For example, if the mobile client 102 is a cell phone, access between the mobile device and network 110 will likely utilize a separate cell network 111 that is maintained by a telecommunications provider.

As shown in FIG. 1, the server computer 104 executes a server-side policy management process 112. This process, along with the client-side process 105 comprises a policy management framework that allows management authorities (e.g., carrier and IT administrator) to control the behavior of mobile devices according to policies that determine aspects such as access control, resource and application utilization, operational characteristics, monitoring, and logging. The server-side process 112 provides functionality to create, edit, and submit policies to devices and then subsequently to manage and monitor these policies.

In general, policy management is the functionality that allows a management authority to define the behavior of a mobile device, so that it conforms to particular network or corporate device usage policy, or operates in accordance with defined operational constraints or principles. For example, an IT manager could specify that mobile device users are not allowed to use the Internet browser during working hours. Using the server-side policy management functionality, they can define a policy that specifies that the phone's browser cannot be launched during work hours (e.g., from 8 am to 5 pm from Monday to Friday). The server sends the policy to the mobile client, or otherwise makes it available to the client. The client-side policy management process 105 then installs the policy and enforces it. This enforcement means that if the user tries to start the browser during a time that is not allowed, the policy framework automatically prevents the browser from starting. Many different types of policies and rules may be defined by the system and enforced on the client device. In one embodiment, the policy management framework targets enterprise devices, such as smartphones that provide functionality to access the Internet, e-mail, and corporate databases, and in many cases store confidential data. Action rule management allows IT administrators to guarantee that these devices adhere to the company policies.

This framework provides an intelligent and autonomous system that allows mobile-devices to self-manage according to the behavior defined by the server, using flexible policies. This approach ensures efficient management without requiring extensive mobile device user input, and resource utilization such as network bandwidth, server power, memory, processor overhead, and other resources.

Client-Side Process

As stated above, the policy management framework consists of the server-side and client-side components. The server-side process provides functionality to create, edit, and distribute action rule sets. The client-side process provides functionality to activate, deactivate, list and enforce action rule sets on the client device.

In one embodiment, the client side process 105 enforces policies that are represented as action rules. Action rule enforcement requires functionality to deliver events, evaluate conditions, and trigger actions when a group of conditions evaluates to true. Furthermore, the client-side architecture must be able to monitor action rule compliance, and therefore, must detect and report violations.

Figure 2:
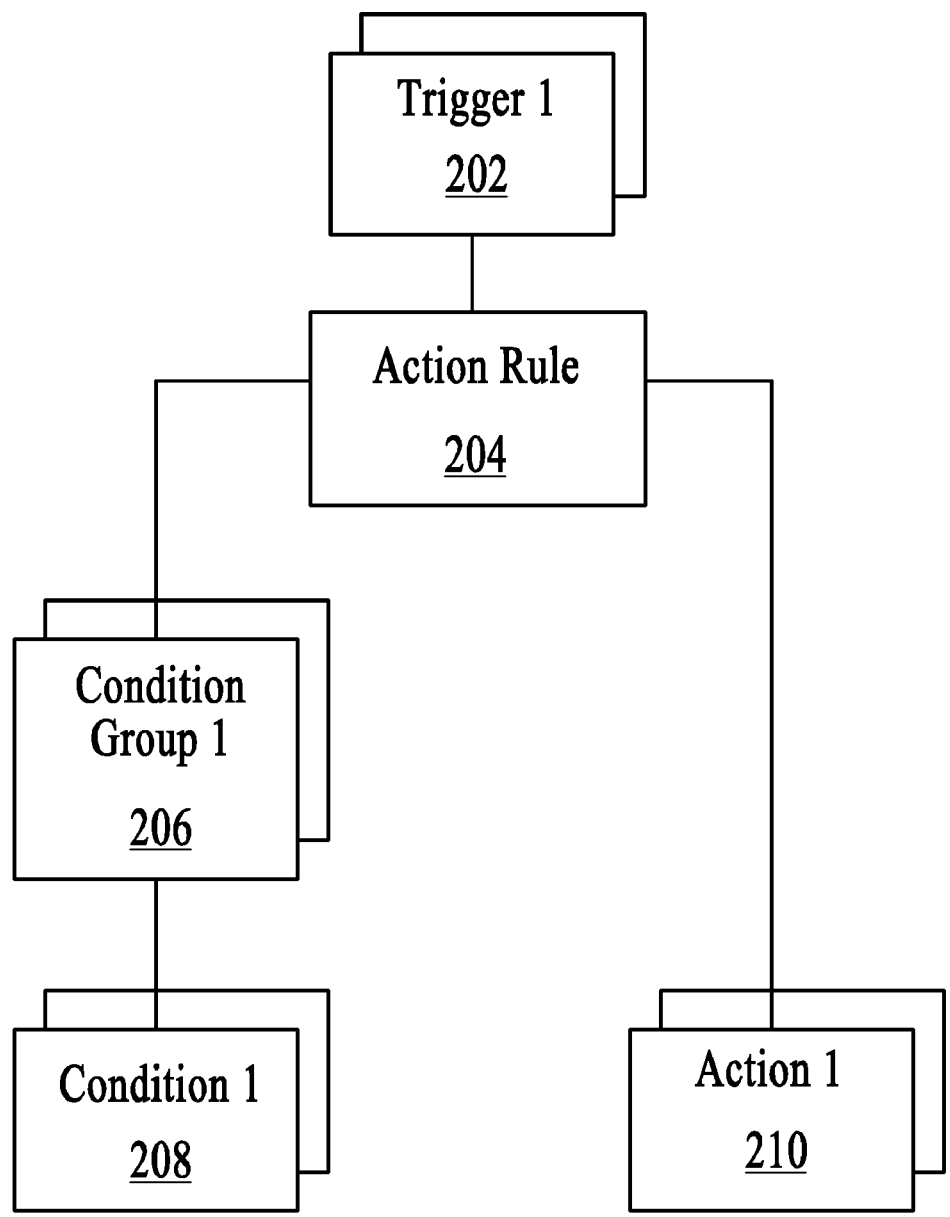
FIG. 2 illustrates the four components of an action rule set, under an embodiment.

An action rule set is a collection of four types of components that enforce a specific behavior. These components are: the trigger, the condition group, the condition, and the action. FIG. 2 illustrates the four components of an action rule set, under an embodiment. As shown in FIG. 2, a trigger 202 is an event that denotes a change in the state of some variable of interest to the action rule 204. Triggers may be related to an operational characteristic of the device and/or a policy rule defined by the system. Some trigger examples include the battery level reaching certain percentage of charge, the device entering a specific location, or the time of day changing to set time, among others. When a trigger 202 notifies an action rule set 204, the action rule evaluates its predicate (conditions) 206. Several different conditions 208 may be organized into one or more condition groups 206. If a condition is true, the action rule 24 then causes execution of an associated action 210.

In one embodiment, each condition 208 comprises a Boolean expression, that is an expression that is either true ('1') or false (null or '0'). An example of a condition is batteryLevel<10%. Action rules can have any practical number 0-n conditions, and these conditions can be grouped together by condition groups 206. In general, an action 210 is a task that is executed when the action rule predicate evaluates to true. An example of an action may be the local device command "switchOffCamera". Thus, for example, if the trigger is the battery charge level, and the condition batteryLevel<10% is true, then the resulting action would be to turn off the camera component of the mobile device.

Figure 3:
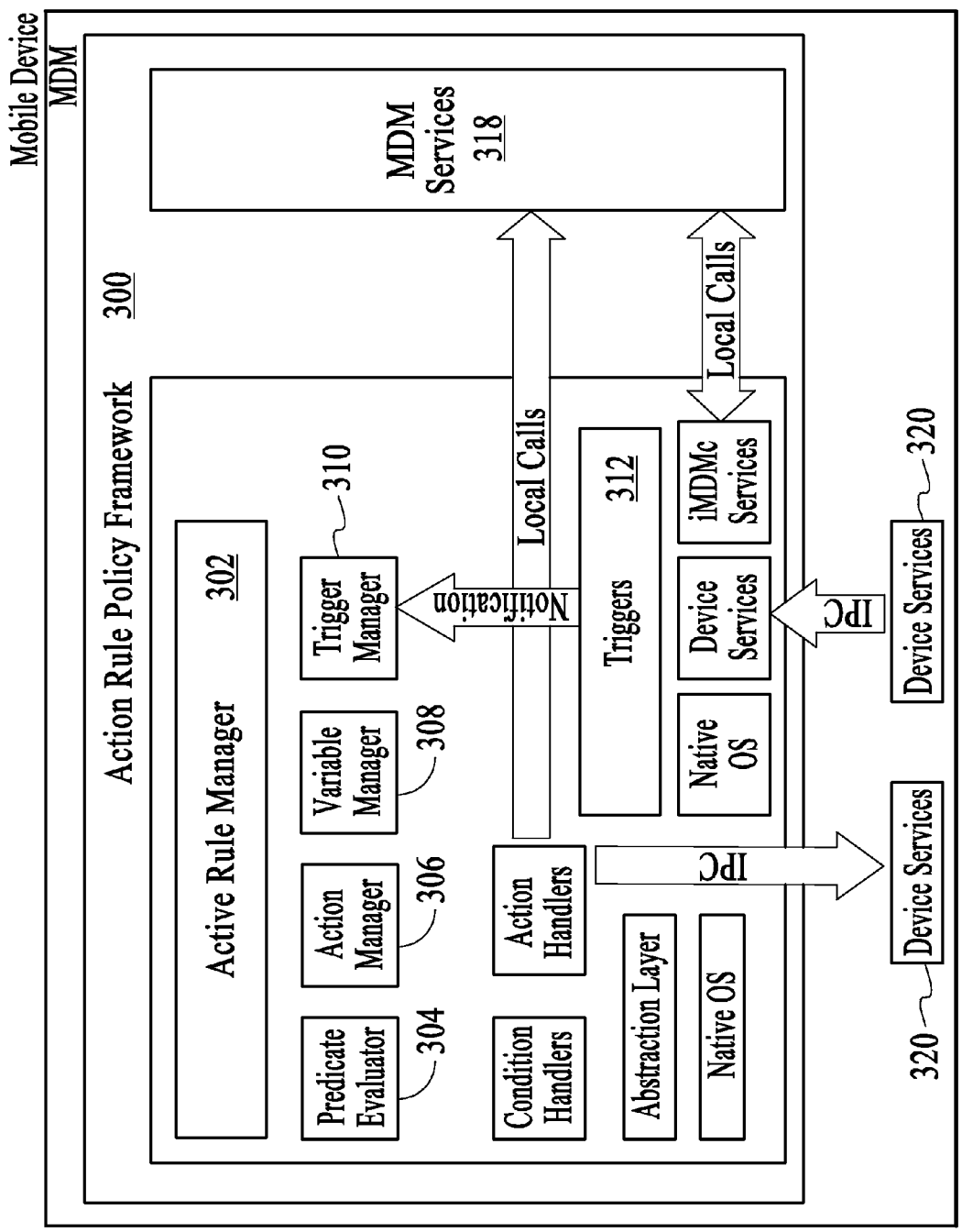
FIG. 3 illustrates an overall architecture for the client-side action rule management process, under an embodiment.

The client-side process 105 includes functional components to active, deactivate, list, and enforce action rule sets on the client device. These components evaluate conditions and trigger actions when one or more conditions are true. FIG. 3 illustrates an overall architecture for the client-side action rule management process, under an embodiment. For the embodiment of FIG. 3, the action rule policy framework of the client-side process 300 consists of components including an action rule manager 302, a predicate evaluator 304, an action manager 306, one or more triggers 312, a trigger manager 310, and a variable manager 308.

The action rule manager 302 coordinates all action rule-related client activities, including activation, deactivation, and enforcement. It leverages three components to achieve the task: Predicate Evaluator, Trigger Manager, and Action Manager. The predicate evaluator 304 evaluates the conditions of the specified action rule. To evaluate the conditions, it relies on one or more condition handlers 305. Every condition handler knows how to evaluate a specific type of expression (e.g., >, <, and =). Some condition handlers may be required to interact with a native operating system (OS) 303 to evaluate a condition. For example, a file or directory management function may be used to determine a particular file size (e.g., File >100 KB). The condition handlers may rely on an abstraction layer 307 that provides a platform independent interface.

The action manager 306 provides functionality to coordinate the execution of actions, and provides different semantics, such as best effort, or strictly all. The action manager forwards the action execution request to action handlers 309, which encapsulate the specific details of each action. Action handlers may interact with native OS 303 services through procedure calls (IPC), or with mobile device management services 318 through local calls. If the action manager 306 requires interaction with the native OS 303, it leverages the abstraction layer 307, which provides a platform independent API.

Triggers 312 are the components responsible for generating notifications when certain conditions are met. A trigger encapsulates a specific state and sends a notification whenever certain preconfigured conditions are met. For example, the timer trigger generates an event every "x" seconds (where "x" is configurable). Triggers maintain a list of listeners. The trigger manager 310 forwards incoming trigger notifications to the appropriate action rule sets. For each affected action rule set it sends a request to the action rule manager 302 to evaluate the action rule. The action rule manager 302 leverages the predicate evaluator 304 to evaluate the action rule's predicate and if the predicate is true, the trigger manager 310 interacts with the action handler 309 to execute the actions. System 300 also includes a variable manager 308 that provides an interface to store and retrieve variables that the different action rule sets use.

In order to ensure implementation flexibility, the client-side policy management system is configured to accommodate new functionality as policies and rules are developed and evolved over time. Update mechanisms are employed to minimize down time, and avoiding reinstallation of the system each time a new feature is available. In embodiment, the client-side process is divided into two main elements of a core infrastructure and the action rule building block handlers (i.e., trigger handlers, condition handlers, and action handlers). The core infrastructure provides the basic functionality for action rule management by orchestrating the different components, and the action rule building block handlers are the components capable of controlling trigger, condition, and action handlers.

The core functionality is independent on the specific details of each action rule instance. It simply orchestrates the interaction among the different action rule building block handlers according to defined rules. The core is configured to be stable and to not require changes, except for maintenance or upgrades. In contrast, the action rule building block handlers (triggers, action handlers, and condition handlers) are tightly coupled to every specific action rule instance. As a result, upgrade processes incorporate new action rule building block handlers at runtime, to accommodate new types of action rules over time. These components also assist in configuring which action rule building blocks a mobile device will support during device configuration or at start up time. This mechanism helps create subsets of devices with different action rule management capabilities depending, for example, on the device type or hardware characteristics.

In one embodiment, the action rule management client architecture leverages a dynamically configurable infrastructure that allows manipulating the available action rule building block handlers at runtime. Dynamically loadable modules implement the triggers, actions, and condition handlers. These modules can be deployed and installed at runtime, so that new handlers are made available to the system as they are available.

An example of the action rule management client process is described as follows for a device that has already been shipped and is currently in use with the action rule framework infrastructure installed on the device. If the carrier decides to monitor the battery drainage rate and send a notification if this rate is higher than a certain value, but the device does not have a trigger to monitor battery drainage and does not have an action handler to send a notification, the carrier uses a defined protocol (e.g., SCoMO, software component management object) to deploy two new modules: battery trigger and notification action. The device receives the modules, detects that are action rule handlers and therefore registers them with the action rule system at runtime. The action rule framework loads the trigger module and registers it with the event source manager. It then loads the action handler and registers it with the action manager. After registration, both the trigger and the action handler IDs are available and ready to use, and the action rule can be enforced.

Figure 4A:
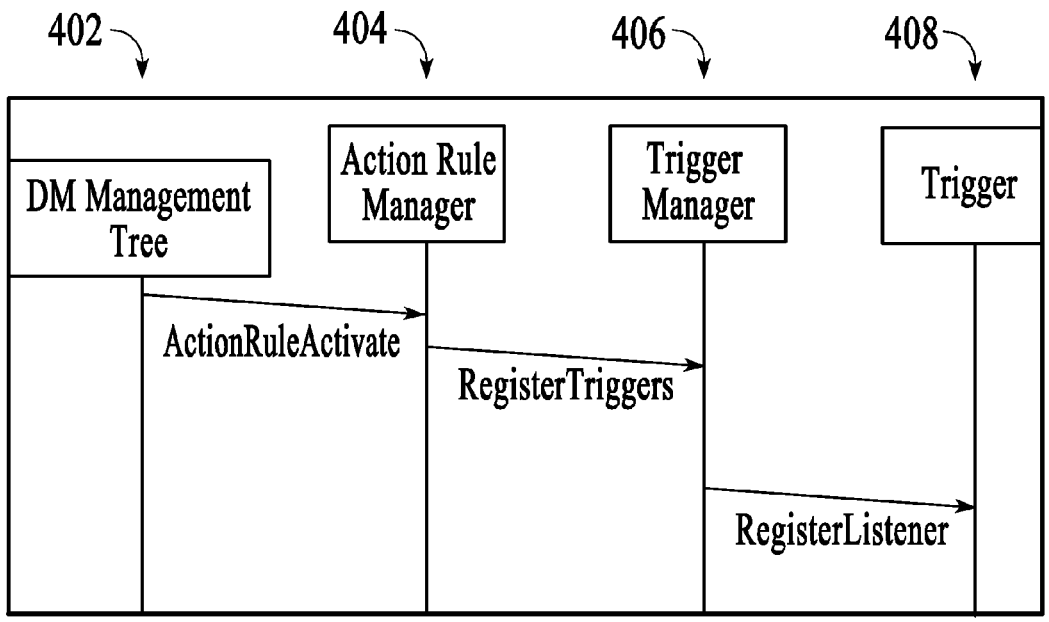
FIG. 4A illustrates the steps of registering an action rule, under an embodiment.

In one embodiment, a set sequence of actions is required for the operations involving registering action rules and evaluating action rules. Action rule registration is responsible for enabling an action rule locally in a mobile device. FIG. 4A illustrates the steps of registering an action rule under an embodiment. The process starts with a server device management process 402 creating a new management object (MO) with the action rule information and then invoking an executable command for the action rule manager 404 "Activate" operation. The action rule process receives the execute command. The action rule manager 404 registers at start up time with the action rule operation nodes (activate, deactivate, and remove) and therefore gets a callback with the URI of the action rule. Next, the action rule manager 404 invokes a RegisterTriggers process of trigger manager 406. This process parses the triggers' information from the MO, extracts the ID of each trigger, and finally invokes the appropriate Trigger 408 to register with it.

Figure 4B:
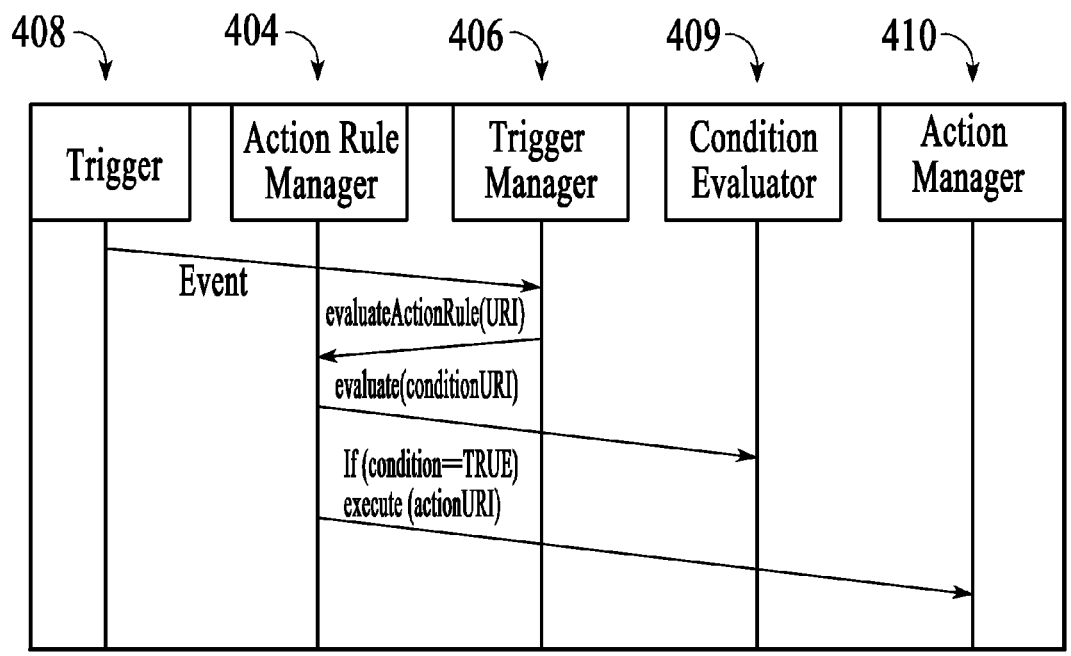
FIG. 4B illustrates the steps of evaluating an action rule, under an embodiment.

When a trigger is fired, the action rule manager is notified and an action rule evaluation process is performed. FIG. 4B illustrates an action rule evaluation process, under an embodiment. When the conditions specified at trigger registration time are met, the event source sends a notification to the trigger manager 406. The trigger manager retrieves the action rule URI from the event and invokes an EvaluateActionRule process on the action rule manager 404. The action rule manager evaluates the predicate of the action rule in the condition evaluator 409, and if the predicate is true, the action rule manager executes the action rule's actions through action manager 410.

Server-Side Process

The overall policy management framework that controls the client-side policy management process on the mobile client device is controlled by a server side process 112, as shown in FIG. 1. The server-side policy management process 112 comprises several distinct functional blocks including policy creator 122, a group policy manager process 124, a device policy manager process 126, and a user interface 128 that allows interaction with a system administrator 140. The server-side management system 112 is configured to implement a policy representation that is relatively simple and standards-based, and addresses a wide variety of use case scenarios. These policy representations can be loaded and stored in a data store 120 of server 104. In one embodiment, the server is configured to upload new policies dynamically to the mobile devices based on different criteria. In an enterprise implementation, one primary criterion is the authority group the subscriber belongs to, and other criteria can include device types, deployment locations, deployment times, and other similar criteria.

The policy creator component 122 allows the system administrator user 140 to create new instances of policies out of the needed components (triggers, conditions, actions) as a state machine, as well as to edit/update existing policies, delete existing policies, or import and export policy instances. In one embodiment, the user interface 128 presents to user 140 a list of existing policies as state machines. For creating or editing a policy, parts of the user interface 128 are dynamic as they represent the components. After the user builds a state machine based on the triggers, conditions, and actions, the policy can be saved to data store 120. The import and delete functions simply change the list of available policies for the user. On export the user can save the policy instance as file.

The group policy manager tool allows the user to manage target groups and associated policies. In general, two views available, a target group view, and a policy view. The target group view allows the user to view all target groups, create, edit, delete a target group, and view policies by a selected target group. The available tasks in the view include adding or removing a policy to or from selected target group, activate or deactivate a policy, check if policy compliance is up to date, synchronize with the device. In this embodiment, the user interface presents a list of existing target groups. For any target group it is possible to view the associated policies. This new view contains a list of these policies and the mentioned actions are available. Adding a policy will show a list of all available policies where the user can select one. When checking the compliance for one or more policies a list is populated containing devices that are out of sync and why. The user has the option to synchronize to the device and so to enforce the compliance.

The second view in the group policy manager tool is the policy view. This view allows the user to view all policies, and view target groups by selected policy. In this case, the user interface shows all available policies and the user can view the associated target groups for a policy.

Policy Management

In one embodiment, the mobile device policy management system comprising both the client-side process 105 and the server-side process 112 is used to manage and enforce policies on the mobile device 102 that fall generally into two types of policies: decision policies and active policies.

The decision policies (yes/no policies) are generally used to control access to some resource or capability from or within the mobile client device. For example, is the mobile user entitled to use a resident application, such as the camera or music player. The embodiment described herein provides a mechanism that enables requests for policy decisions to be quickly and efficiently handled. The decision policies include a component (policy enforcement point) that checks whether or not access to the resource is allowed, based on the user request and the resource associated to the decision policy as well as evaluation of some additional predicates, such as time of day, device location, and so on.

The active policies initiate an action on the mobile client device when certain conditions are met. For example, switching from "ring" mode to "vibrate" mode to indicate an incoming call when the device moves within certain geographic coordinates, (e.g., when the device has moved inside of a concert hall or conference room). The active policy relies on the policy enforcement component, which receives events from different event generators (e.g., context sensors and hardware and software notifications) and triggers actions when the conditions specified in the active policies are met.

Figure 5A:
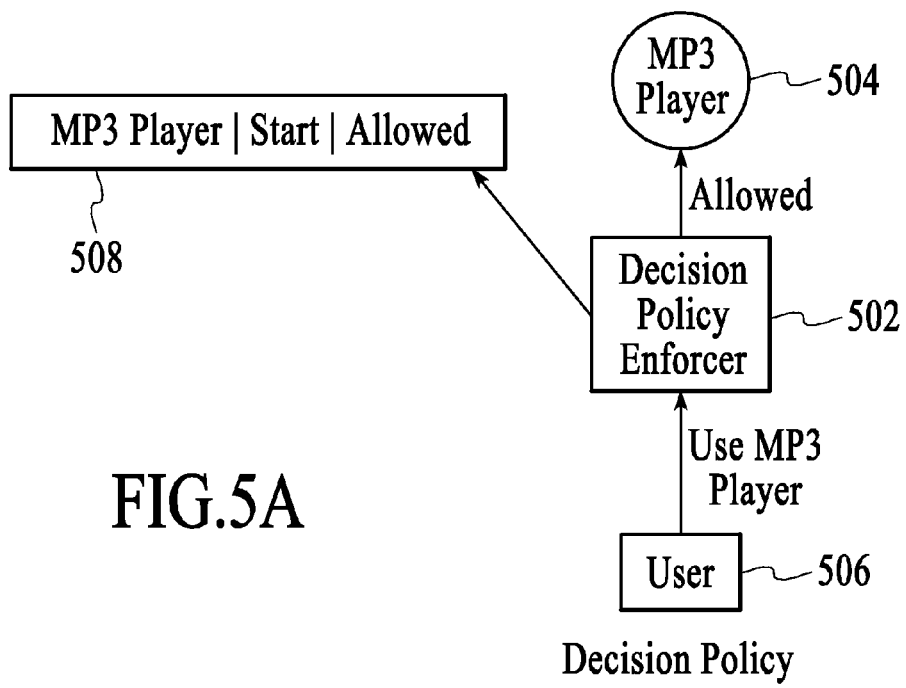
FIG. 5A is a block diagram of a decision policy example, under an embodiment.

FIG. 5A is a block diagram of a decision policy example, under an embodiment. As shown in FIG. 5A, the decision policy enforcer 502 is invoked when the user 506 attempts to access a policy controlled resource on the mobile client. For the example of FIG. 5A, the user has elected to use the resident MP3 player 504. The decision policy enforcer applies applicable policy rules along with any additional relevant predicates and determines whether or not access to the requested resource is allowed. If access is allowed, as shown in FIG. 5A, the decision policy enforcer 502 causes execution of the appropriate command, in this case start_MP3player 508.

Figure 5B:
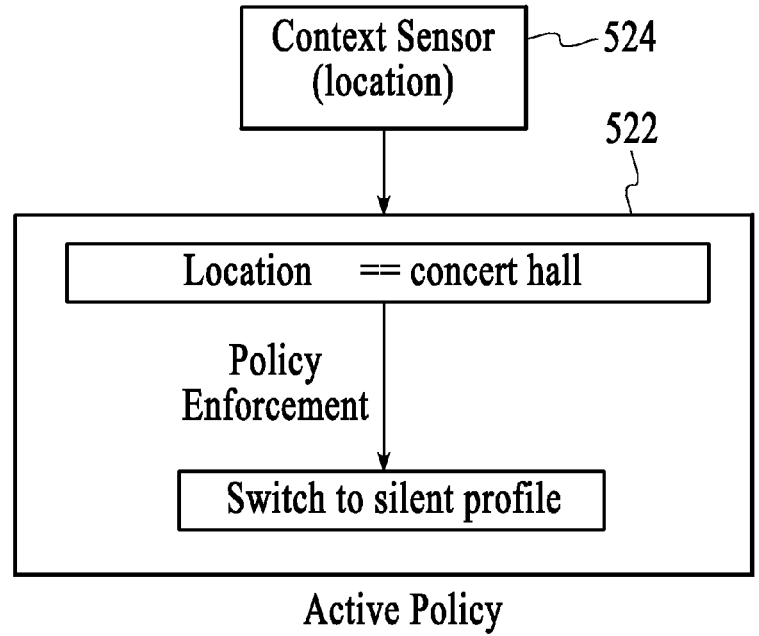
FIG. 5B is a block diagram of an active policy example, under an embodiment.

FIG. 5B is a block diagram of an active policy example, under an embodiment. For the example of FIG. 5B, one or more context sensors 524 in the mobile device provide sensor data to a policy enforcement component 522. Sensors can be any type of sensor within, or coupled to the mobile device that provides relevant data. Examples include clocks, timers, GPS (global positioning system) circuitry, temperature, environmental/weather, radio status, signal strength, power monitoring, and any other similar type of sensor device. The sensors may be embodied in hardware circuitry or software processes, or any combination of hardware and software. The policy enforcement component 522 includes a process that receives and interprets the sensor data. For the example of FIG. 5B, this component has determined that the location sensor 524 has provided data indicating that the mobile device is inside of a concert hall. The policy enforcement component 522 also includes a process to enforce any applicable policy rule based on the sensor data. In this case, the policy rule based on the location of the device dictates that the device be placed in silent mode.

Figure 6:
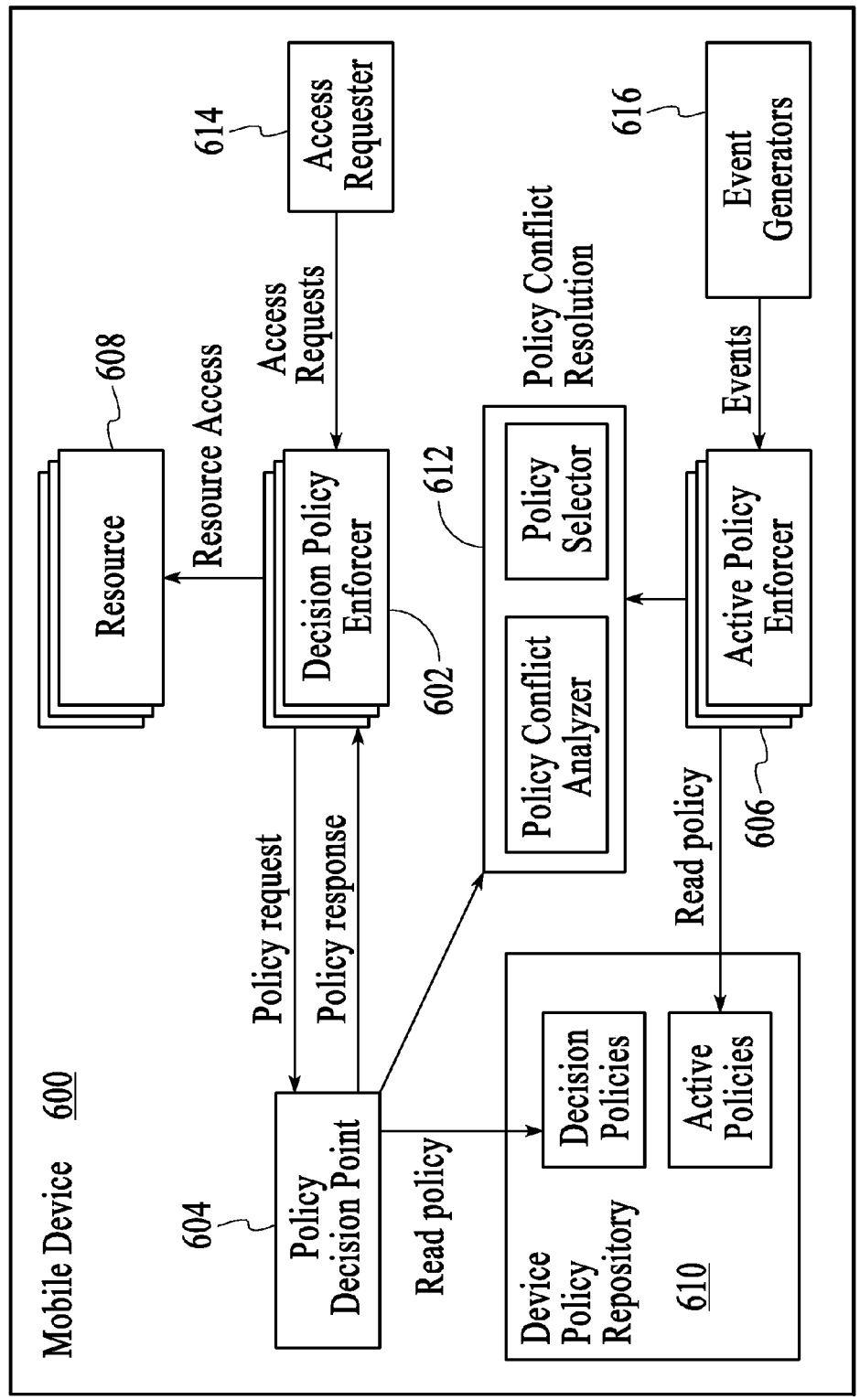
FIG. 6 is a block diagram of a client-side system configured to manage and enforce decision policies and active policies, under an embodiment.

FIG. 6 is a block diagram of a client-side system configured to manage and enforce decision policies and active policies, under an embodiment. System 600 includes a decision policy enforcer component 602 that is responsible for enforcing decision policies together with the policy decision point 604. An active policy enforcer component 606 is responsible for enforcing active policies. The decision policy enforcer stores a list of resources 608 to which it controls access. These resources are typically application programs, utilities, circuitry, functions, or features that are resident on the mobile device itself, such as phone, input/output (I/O), camera, music player, audio recorder, video recorder, scanner, GPS, data storage and other functions. The policy decision point 604 is responsible for determining whether or not access to a resource 608 should be granted based on the information stored in the policy. Policy rules are stored in a device policy repository 610 is a data base that stores both active and decision policies.

Under certain circumstances, policy conflicts may arise, such as when two conflicting policies may be applied, or predicate conditions may be confusing. A policy conflict resolution subsystem 612 is responsible for analyzing policy conflicts through a policy conflict analyzer, and resolving any conflicts by selecting the most appropriate policy or returning an exception through a policy selector.

With regard to enforcing of policies on mobile device, under an embodiment, when a request for accessing a resource arrives from an access requester 614, the decision policy enforcer 602 intercepts the request and interacts with the policy decision point 604 to determine whether or not the request is authorized. The policy decision point 604 extracts the associated policy from the device policy repository 610, evaluates it, and returns either "grant" or "deny" to the policy enforcement point 602. If the decision is "deny," then the policy enforcement point cancels the request. If the decision is "grant", then the policy enforcement point allows the request to proceed.

In the case of active policies, the active policy enforcer 606 periodically receives events from different event generators 616. Event generators can include hardware and software status and context events, as well as other similar events. The active policy enforcer 606 matches these events against the conditions (predicates) defined in the active policies database of the device policy repository 610. When the predicate of an active policy evaluates to true, the active policy enforcer executes the action defined in the policy.

Figure 7:
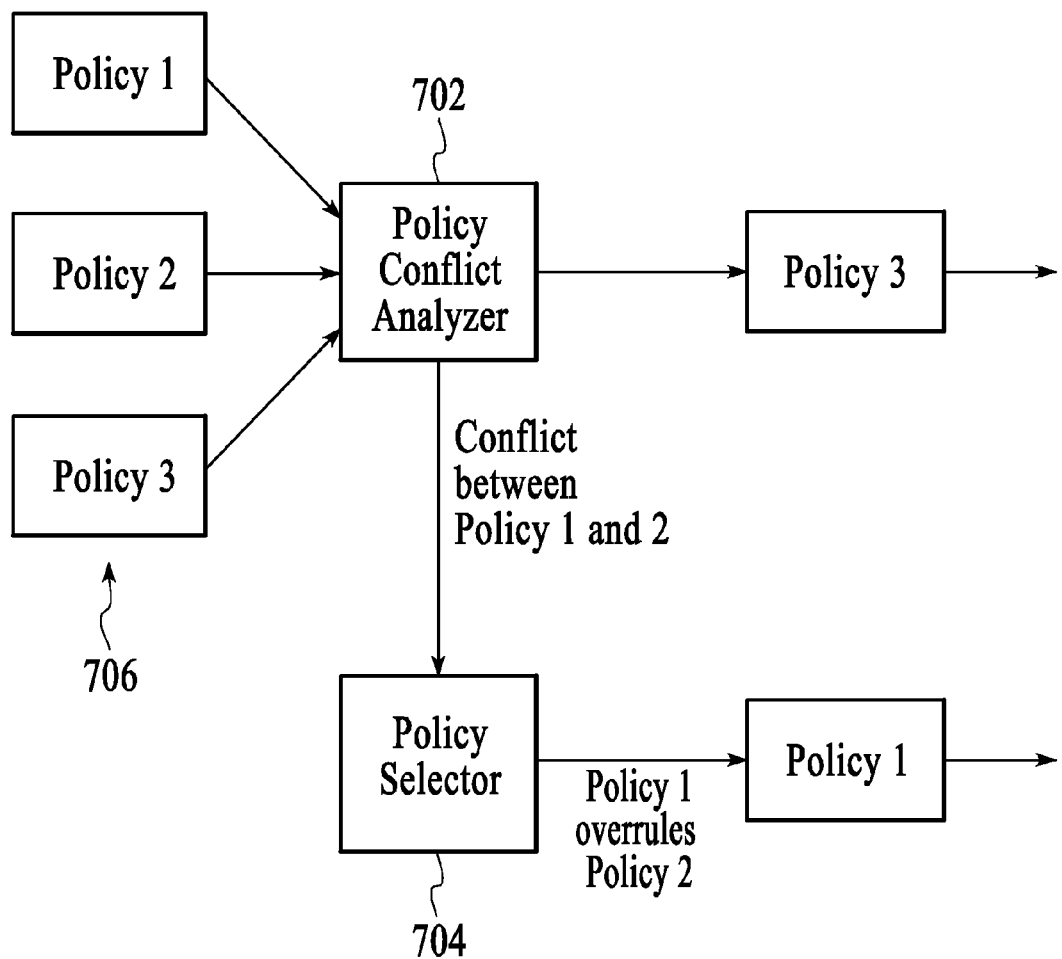
FIG. 7 is a block diagram showing an example of policy conflict detection and resolution, under an embodiment.

Both, the policy decision point 602 and the active policy enforcer 606 may face situations where more than one policy applies to the specific action. Furthermore, there are cases where these multiple policies contradict each other. The policy conflict resolution module 612 is responsible for dealing with such conflicts. FIG. 7 is a block diagram showing an example of policy conflict detection and resolution, under an embodiment. The policy conflict detection and resolution of an embodiment ensures that the results of combining policies from multiple parties are deterministic and predictable. In a case in which more than one policy applies, the policies can be active, decision, or a combination of both. Furthermore, these policies can belong to the same administration domain or different domains. As shown in FIG. 7, a policy conflict analyzer 702 receives a number of policies 706 as an input parameter and analyzes whether there is a conflict among them. For example, policy 1 may allow the user to access a particular file, while policy 2 does not. Under the example illustrated in FIG. 7, policy 3 does not conflict with either policy 1 or policy 2 and can therefore be applied. The policy conflict analyzer 702 forwards policies 1 and 2 to a policy selector component 704, which chooses one of them based on a priority scheme. The priority scheme for policies may be defined by the system administrator or other management function and stored in a central database accessible to the policy conflict resolution module 612. For the example of FIG. 7, a policy priority dictates that policy 1 overrules policy 2, and therefore, the policy selector 704 allows policy 2 to be applied.

With reference to FIG. 6, the device policy repository component 610 stores policies on the mobile device. The device policy repository of an embodiment can store two types of policies on the device, including decision policies and active policies, but is not so limited. Active policies describe a set of actions that must be taken based on an event occurrence (e.g., time of day, smart card insertion, and so on) and/or evaluation of some predicates. For a given resource, decision policies of an embodiment describe what roles (or entities) can perform/access what operations under specified conditions. Decision policies may also describe additional predicates (e.g., time of day) which need to be evaluated before a decision is made. Decision policies may be expressed in standard languages such as XACML[X], for example. XACML (eXtensible Access Control Markup Language) is a declarative access control policy language implemented in XML (Extensible Markup Language) and a processing model, describing how to interpret the policies. The use of XACML makes possible a simple, flexible way to express and enforce access control policies in a variety of operating environments, using a single language.

With reference to FIG. 6, the policy decision point component 604 of an embodiment makes a policy decision as to whether access to a resource 608 is granted or not based on attributes of a request from the decision policy enforcer 602 and the decision policy stored in the device policy repository 610. The decision policy enforcer 602 enforces policies for access control in response to a request from an entity 614 wanting to perform an operation or access a resource. There may be more than one decision policy enforcer on the mobile client device. The decision policy enforcer 602 passes the incoming access requests to the policy decision point 604, which makes an access allowed or access denied decision. If access is allowed, the decision policy enforcer 602 allows access to the requested resource. If access is denied, the decision policy enforcer 602 returns an appropriate status message back to the access requester.

Figure 8:
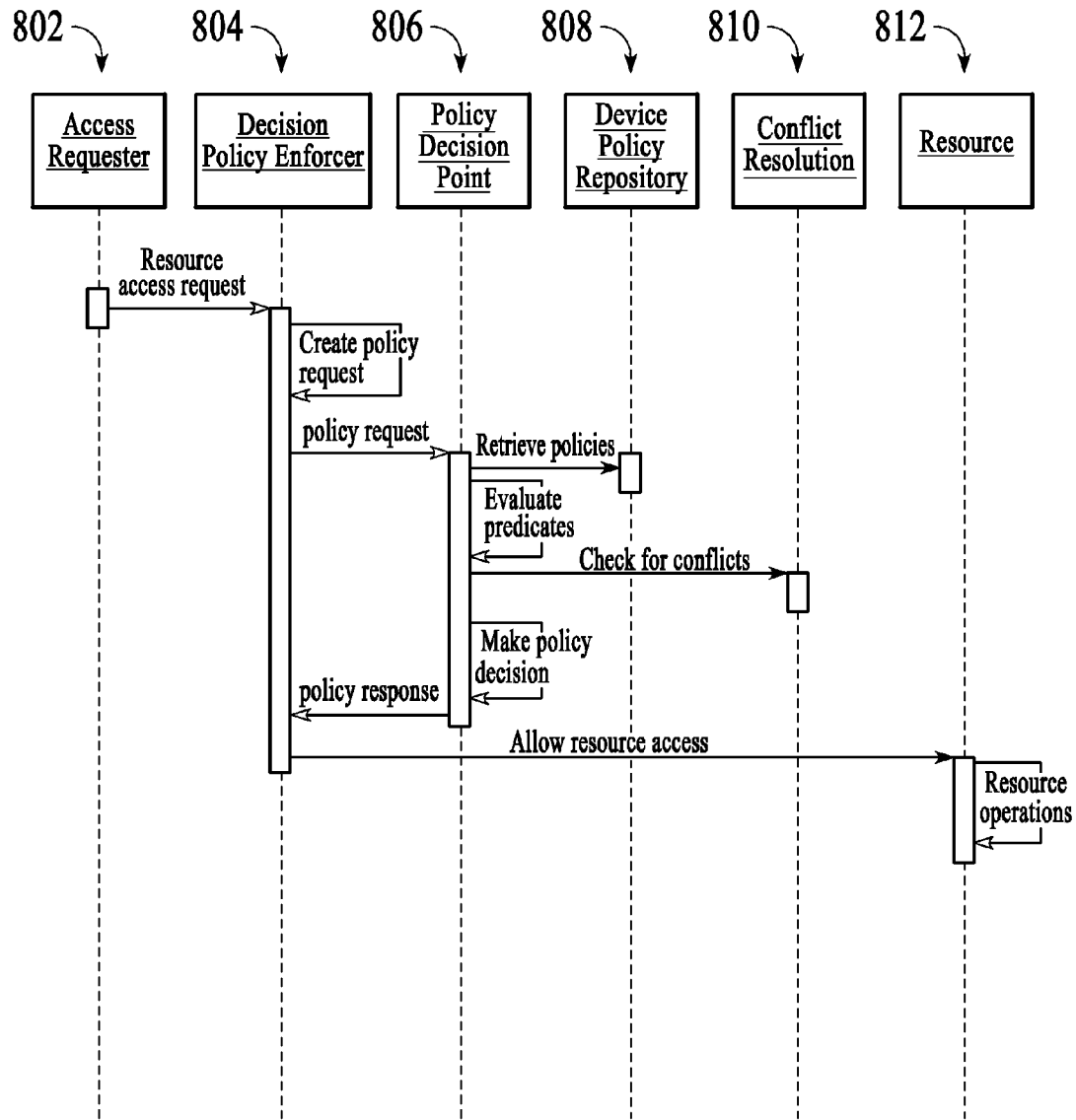
FIG. 8 is a flow diagram illustrating a method of enforcing decision policies, under an embodiment.

FIG. 8 is a flow diagram illustrating a method of enforcing decision policies, under an embodiment. The flow diagram starts with an access requester (principal) 802 requesting access to a resource 812, such as a file. The decision policy enforcer 804 intercepts the request, and creates and sends a request to the policy decision point 806. The policy decision point 806 retrieves the resource associated policy or policies from the device policy repository 808, and performs any predicate evaluations (if necessary). The policy decision point 806 then sends a request to the conflict resolution unit 810. The conflict resolution unit 810 analyzes the policies and in case of conflicts, it resolves these conflicts and returns the policy or policies that prevail. The policy decision point 806 gets the result, makes a decision and returns it to the decision policy enforcer 804, which allows or denies the access to the resource 812.

As shown in FIG. 6, the active policy enforcer 606 enforces active policies in response to an event occurrence (e.g., time of day) in addition to evaluating some predicates (e.g., location of the device). The active policy enforcer may be notified of an event occurrence in a multitude of ways including, but not limited to, using an event bus mechanism, or direct notification from the event generators.

Figure 9:
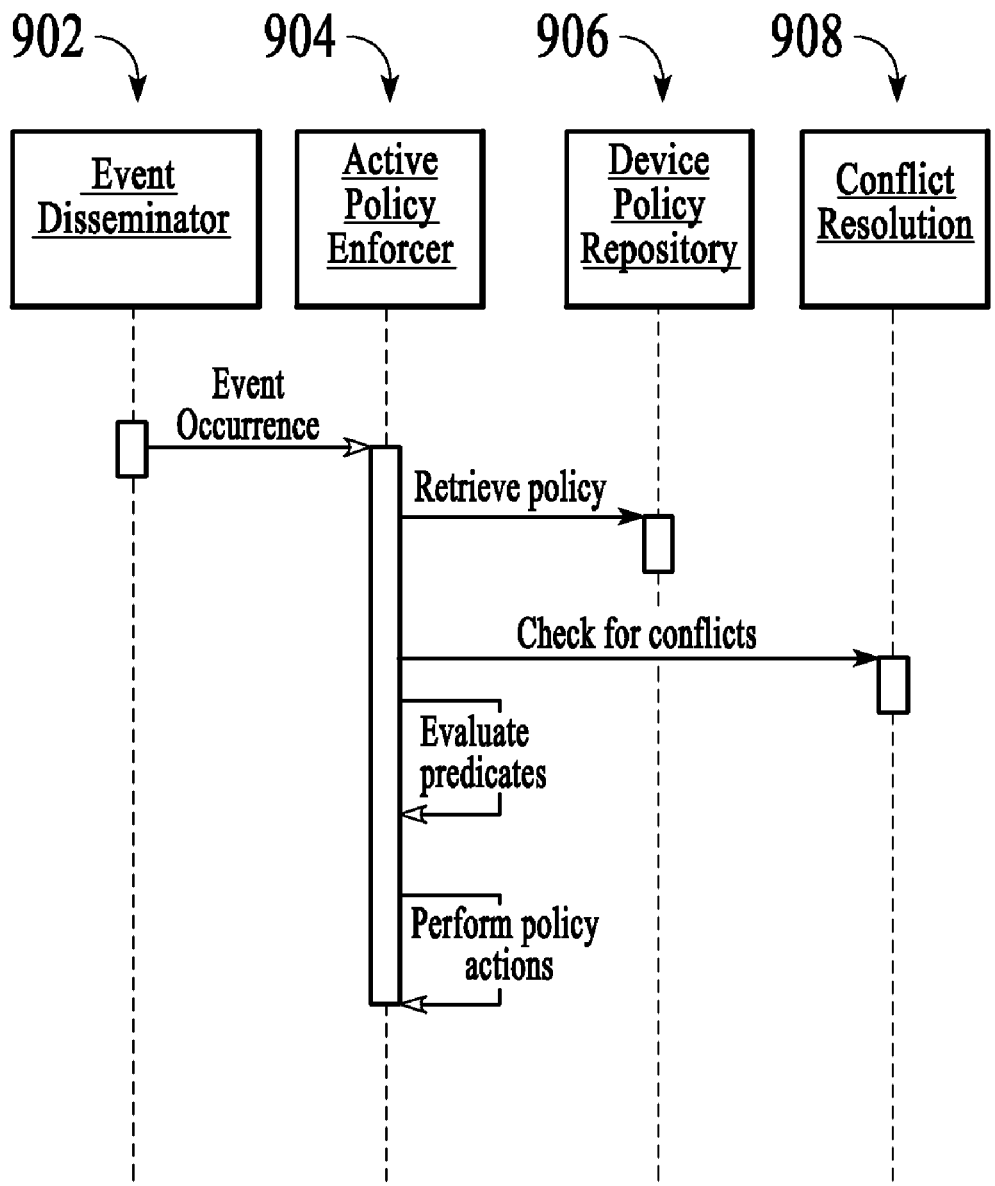
FIG. 9 is a flow diagram illustrating a method of enforcing active policies, under an embodiment.

FIG. 9 is a flow diagram that illustrates a method of enforcing active policies, under an embodiment. The active policy enforcer is registered with event generators that notify it about changes in the state of the mobile device context. A Global Positioning System (GPS) service is an example of an event generator. Other examples include timers, clocks, signal strength indicators, battery charge indicators, and the like. The number of event generators that the active policy enforcer is registered with depends on the predicates of the active policies. It is possible for the active policy enforcer to respond to both device as well as remote network events. In the case of remote network events, the event disseminator receives and processes remote network events and notifies the active policy enforcer for appropriate action. As shown in FIG. 9, the flow of active policy enforcement starts with an event generator (disseminator) 902 sending an event to the active policy enforcer 904. The active policy enforcer 904 retrieves from the device policy repository 906 all the policies for which the predicates depend on the specific event. The active policy enforcer 904 then sends the policies to the conflict resolution unit 906, which looks for conflicts and selects the prevailing policies. With these results, the active policy enforcer 904 evaluates the predicates, and performs the actions defined in the policies.

As shown in FIG. 6, the policy conflict resolution subsystem 612 receives a number of policies and determines whether or not policies that are to be applied are in conflict with one another. For example, when the system detects an event such as "start application X", the system checks the existing active policies to determine whether they affect the current event. One possible scenario could be two active policies matching the specified event. It could also happen that the policies have been set by two different administrators, and one of them allows the application to run, while the other one does not. The policy conflict analyzer analyzes the two active policies, and determines that they conflict. As a result, the policy conflict analyzer 702 of FIG. 7 forwards the two or more conflicting policies to the policy selector component 704 that determines which policy prevails. The decision algorithm is programmable, and can be based on defined rules, such as policy priorities, device user input, or even decision policies, to name a few. In addition, it is also possible for the policy selector 704 to ask a network server to make an arbitration decision.

Policy conflict detection and resolution is implemented at the mobile device itself, to handle the cases where conflicts are due to dynamic properties, such as time and location. For example, during working hours, a policy may allow the use of a game, while another policy may not. Such a conflict only arises at a specific time of day. Server-based conflict detection and resolution might not be sufficient to handle these dynamic cases, because they would only be checked during submission time, and not at the time when the policy must be enforced.

Figure 10:
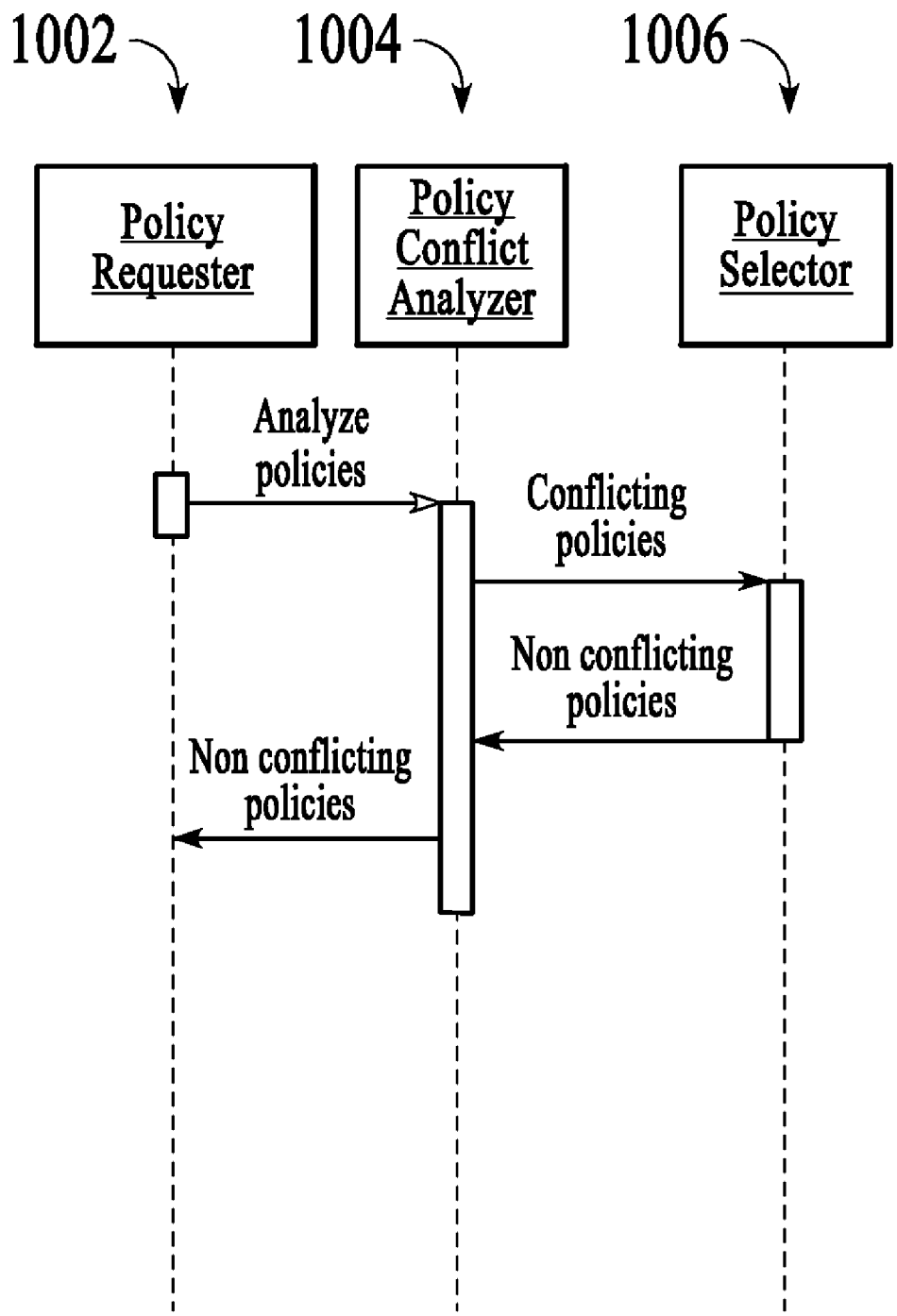
FIG. 10 is a flow diagram of a method for analyzing and resolving policy conflicts, under an embodiment.

FIG. 10 is a flow diagram illustrating a process of analyzing and resolving policy conflicts, under an embodiment. As shown in FIG. 10, the policy conflict analyzer 1004 gets a set of policies from the policy requester 1002. The policy conflict analyzer 1004 then analyzes the policies and checks for conflicts. If the policy conflict analyzer detects conflicts, it sends the affected policies to the policy selector 1006, which makes a decision as to the prevailing policy (if any). The decision can be done according to priorities or any other configurable algorithm (which could use a policy to decide).

Implementation of Mobile Device Management

In one embodiment, the mobile device policy management framework of FIG. 1 includes a system configured to manage policies, including decision policies and active policies, on mobile devices is described above that includes a device policy repository, a policy decision point, a decision policy enforcer, and an active policy enforcer. The system includes a method for enforcing policies on mobile devices that proactively monitors the execution environment and automatically triggers active policies. The method further exports an interface and provides functionality to evaluate and enforce decision policies. The system can combine policies from different sources, including detecting and avoiding policy conflicts.

In one embodiment, the client-side process 105 of FIG. 1 incorporates system 600 of FIG. 6 and is implemented as an intelligent management agent residing in the mobile client device 102. The intelligent management agent relies on communication between the client-side mobile management process 105 residing on a mobile device and the server-side mobile device management (MDM) process 112 residing in server 104.

In one embodiment, a standard management protocol, such as OMA DM (Open Mobile Alliance Device Management), is used by the server retrieve, analyze and set management properties values for the mobile client. In general, the OMA DM specification is designed for management of small mobile devices such as cell phones, PDAs and palm top computers, and can be used to manage virtually any type of networked device.

The device management function is intended to support the following typical uses: provisioning including configuration of the device, enabling and disabling features; software upgrades, fault management, and the like.

In one embodiment, a client-side process may be downloaded to the client device using the OMA DM protocol and SCoMO (Software Component Management Object) standard that specifies the protocol to manage software remotely on mobile devices. SCoMO generally dictates the installation, uninstallation, launching and termination of software on mobile devices. The mobile client 102 of FIG. 1, and every other device that supports OMA DM contains a management tree. The management tree contains and organizes all the available management objects so that the server 104 can access every node directly through a unique URI (uniform resource identifier).

As stated previously, the policies are represented in the server using XML structures for the respective action-condition-trigger components. On the mobile client device, each policy is represented as a subtree. This mechanism leverages the subtree structure provided by OMA DM and facilitates execution on the mobile client. In an embodiment, the server leverages XML to store the policies, but the client does not. The client uses the OMA DM management tree structure to store the information. The server parses the XML document and automatically creates a subtree with all the information. The server then creates the subtree on the client device remotely.

A software manager process may be provided to facilitate download of the client-side management process to the mobile client device. In one implementation, the user has control over the software to be downloaded (user pull scenario), and applications may be provided by a third party server. The user first accesses the server computer software management portal, whether on the mobile device itself or through a separate computer. The portal, where the application and its attributes are selected communicates with any third party application or content server. The MDM server initiates a control connection to the mobile client, after which a connection to the content server is authorized and established. In another implementation, the operator or enterprise controls the application download (operator push scenario). For example, in an enterprise setting, the IT department may mandate the download of an application patch or new anti-virus signature file. Here, the enterprise or operator sets the download in motion through an MDM console. The MDM server and any third party content server then establish connections to the mobile device.

In one embodiment, a configuration manager in a carrier suite of the MDM server manages configuration settings on the mobile device over the wireless (cellular) network. For OMA DM applications, the carrier suite configures virtually any application on the mobile device for which configuration is handled by setting the values of objects in the OMA DM management tree. Certain OMA DM applications may be predefined, such as bootstrap routines, diagnostics, and other applications.

Figure 11:
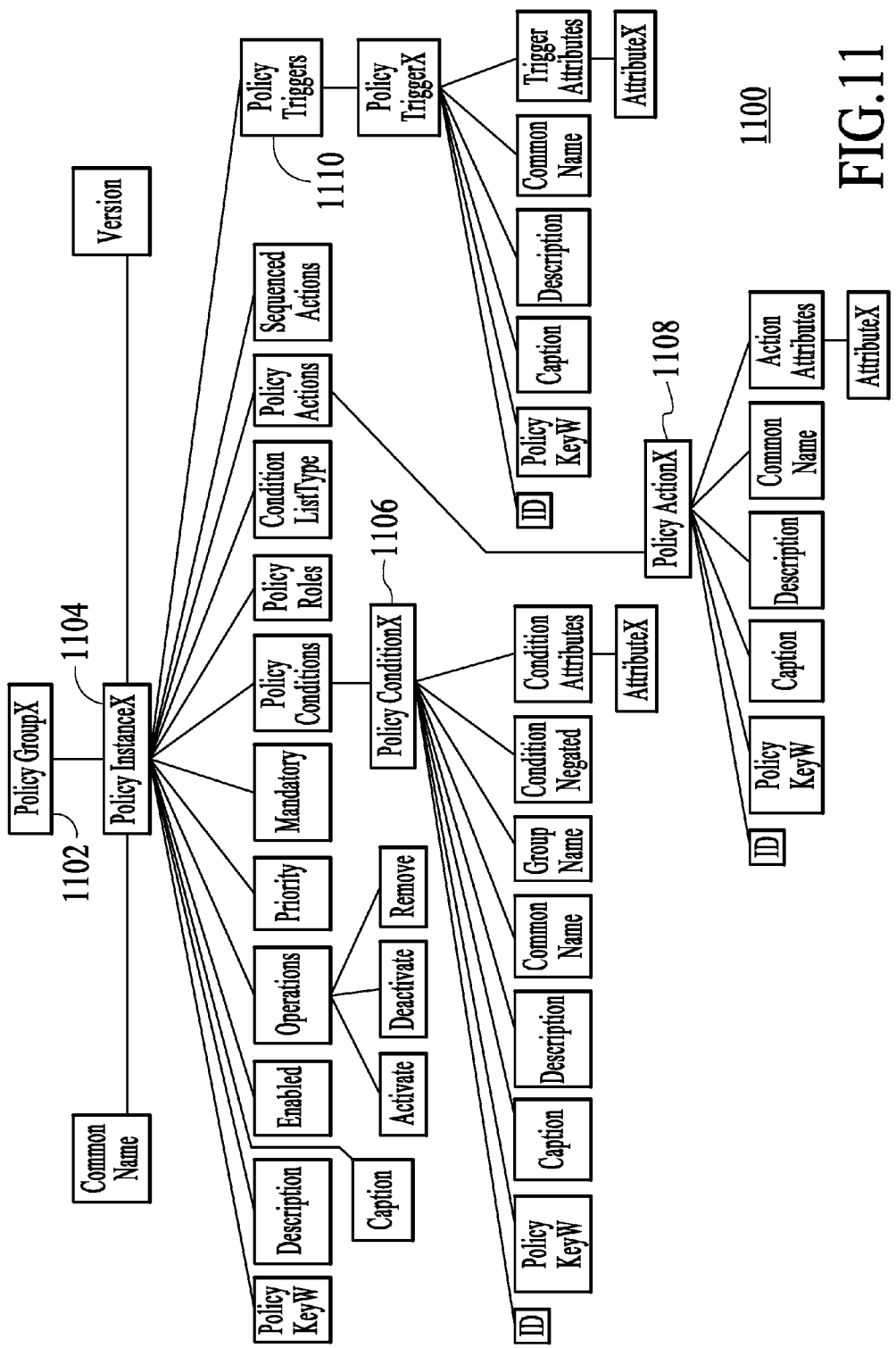
FIG. 11 illustrates a management tree representation for policies within the policy management system, under an embodiment.

FIG. 11 illustrates a management tree representation for policies within the policy management system, under an embodiment. In general, the management tree comprises a number of hierarchically organized nodes, which are entities that are managed through the OMA DM protocol. An interior node can have an unlimited number of child nodes, while a leaf node must contain a value, including null. Each node has a set of run-time properties associated with it. All properties are only valid for the associated node. An access control list (ACL) for a node represents which server can manipulate that node. The manipulation includes adding a child node, getting the node's properties, replacing this node, or deleting this node, as well as other run-time properties.

As shown in FIG. 11, the management tree contains all relevant information about a policy. A policy group 1102 may have one or more policy instances 1104. Each policy instance has a version number for revision control purposes and may have a common name. Each policy has a number of subnodes that contain various data objects related to the policies. A number of these subnodes can have further subnodes, as shown. The main subnodes for use in the policy management system include the policy condition subnode 1106, the policy action subnode 1108 and the policy triggers subnode, 1110. These represent key subtrees within the policy management tree 1100.

In an embodiment, the server 104 takes the XACML file of the management tree, parses it and generates one or more different subtrees. For the management tree example of FIG. 11, the server-side process 112 takes the entire policy group management tree under the URI for root node 1102 and parses it into at least subnodes for the policy conditions subtree under node 1106, the policy action subtree under node 1108, and the policy trigger subtree under node 1110. This processing of the management tree XACML to manage policies that are autonomously executed on the mobile device represents a unique usage of the OMA DM specification, and advantageously facilitates the creation, management, and dissemination of policies among various mobile devices in a distributed network environment.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

Components of the systems and methods described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods described herein is not intended to be exhaustive or to limit the systems and methods described to the precise form disclosed. While specific embodiments of, and examples for, the systems and methods described herein are described herein for illustrative purposes, various equivalent modifications are possible within the scope of other systems and methods, as those skilled in the relevant art will recognize. The teachings of the systems and methods described herein provided herein can be applied to other processing systems and methods, not only for the systems and methods described above.

The elements and acts of the various embodiments described above can be combined to provide further embodiments. These and other changes can be made to the systems and methods described herein in light of the above detailed description.

What is claimed is:

1. A system to define and enforce policies on an Open Mobile Alliance Device Management (OMA DM) enabled mobile client device coupled to a server computer over a computer network, comprising:
   a mobile client device comprising a processor and a non-transitory memory;
   a server-side process configured to allow creation, modification and transmission of defined policies including decision policies and active policies to the mobile client device, wherein the decision policies control access to mobile client device resources using one or more of a role of a user requesting access and a circumstance of the request, wherein the active policies associate one or more operations of the client device with an occurrence; and
   a client-side process executed on the mobile client device and configured to store the defined policies in an OMA DM management tree in the memory of the mobile client device as management objects, wherein each policy of the defined policies is represented as a subnode of the management tree, wherein a policy conflict module determines a set of the defined policies relating to at least one of the occurrence and the one or more of a role of a user and a circumstance of the request, identifies conflicts between defined polices of the set before application of any defined policy of the set, and resolves the conflicts using a priority.

2. The system of claim 1 wherein the management tree comprises a root node defining a policy group that has one or more policy instance subnodes.

3. The system of claim 2 wherein each policy represents a subtree within the management tree, and wherein each policy subtree has a policy condition subnode, a policy action subnode, and a policy triggers subnode.

4. The system of claim 3 wherein the client-side process includes a module to monitor the execution environment of the mobile device and automatically trigger one or more defined policies upon an occurrence of an event, and wherein the policies consist of one or more action rule sets, each action rule set comprising:
   trigger events denoting a change in state of a variable of interest to an action rule of the action rule sets;
   conditions comprising a yes or no value associated with the variable of interest; and
   actions comprising a task to be executed by the mobile device when a corresponding condition is true.

5. The system of claim 4 wherein data objects related to each of the trigger events, conditions, and actions are specified within a corresponding subnode of the policy subtree.

6. The system of claim 5 wherein the policies are stored on the mobile device as subtrees within the management tree.

7. The system of claim 6 wherein the policies are created by the server as nodes directly on the mobile device.

8. The system of claim 7 wherein the mobile client device comprises a smartphone coupled to the server computer over one or more wireless networks.

9. A method of defining and enforcing policies on an Open Mobile Alliance Device Management (OMA DM) enabled mobile client device coupled to a server computer over a computer network, comprising:
   executing a server-side process that is operable to allow creation, modification and transmission by a system administrator of defined policies including decision policies and active policies to the mobile client device, wherein the decision policies control access to mobile client device resources using one or more of a role of a user requesting access and a circumstance of the request, wherein the active policies associate one or more operations of the client device with an occurrence; and
   executing a client-side process on the mobile client device that is operable to store the defined policies in an OMA DM management tree in the mobile client device as management objects, wherein each policy of the defined policies is represented as a subnode of the management tree, and further wherein the management tree comprises a root node defining a policy group that has one or more policy instance subnodes, wherein a policy conflict module determines a set of the defined policies relating to at least one of the occurrence and the one or more of a role of a user and a circumstance of the request, identifies conflicts between defined polices of the set before application of any defined policy of the set, and resolves the conflicts using a priority.

10. The method of claim 9 further comprising organizing the management tree under a policy group root node including at least one policy instance subnode.

11. The method of claim 10 further comprising parsing the management tree into a first subtree for policy conditions of the policy instance, a second subtree for policy actions of the policy instance, a third subtree for policy triggers of the policy instance.

12. The method of claim 11 further comprising monitoring the execution environment of the mobile device and automatically triggering the policy instance upon an occurrence of an event.

13. The method of claim 12 wherein the policies consist of one or more action rule sets, each action rule set comprising:
   trigger events denoting a change in state of a variable of interest to an action rule of the action rule sets;

conditions comprising a yes or no value associated with the variable of interest; and actions comprising a task to be executed by the mobile device when a corresponding condition is true.

14. The method of claim 13 further comprising storing data objects related to each of the trigger events, conditions, and actions within a corresponding subnode of the policy instance subtree.

15. The method of claim 14 further comprising storing the policies on the mobile device as subtrees within the management tree.

16. The method of claim 15 further comprising creating the required nodes directly on the mobile device.

* * * * *